United States Patent
Jimenez Hernandez et al.

(10) Patent No.: US 10,131,286 B2
(45) Date of Patent: Nov. 20, 2018

(54) ROOF RACK SYSTEM FOR A MOTOR VEHICLE

(71) Applicant: FORD GLOBAL TECHNOLOGIES, LLC, Dearborn, MI (US)

(72) Inventors: Alvaro Jimenez Hernandez, Miguel Hidalgo (MX); Oswaldo Perez Barrera, Texcoco (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/410,198

(22) Filed: Jan. 19, 2017

(65) Prior Publication Data
US 2018/0201198 A1    Jul. 19, 2018

(51) Int. Cl.
*B60R 9/04* (2006.01)
*B60R 9/045* (2006.01)
*B60R 9/08* (2006.01)

(52) U.S. Cl.
CPC .............. *B60R 9/045* (2013.01); *B60R 9/08* (2013.01)

(58) Field of Classification Search
CPC ............ B60R 9/045; B60R 9/08; B60R 9/042
USPC .................................................. 224/321, 310
See application file for complete search history.

(56) References Cited

U.S. PATENT DOCUMENTS

| | | | |
|---|---|---|---|
| 5,511,708 A | 4/1996 | Cronce et al. | |
| 5,752,635 A * | 5/1998 | Blankenburg | B60R 9/045 211/209 |
| 5,752,637 A * | 5/1998 | Blankenburg | B60R 9/045 224/321 |
| 5,758,810 A | 6/1998 | Stapleton | |
| 6,068,169 A | 5/2000 | Aftanas | |
| 2006/0133914 A1 | 6/2006 | Derks | |
| 2013/0315693 A1* | 11/2013 | Diverdi | B60R 9/0423 414/462 |

FOREIGN PATENT DOCUMENTS

| | | |
|---|---|---|
| FR | 2727070 A1 | 5/1996 |
| GB | 2534868 A | 8/2016 |
| KR | 20020010331 A | 2/2002 |

OTHER PUBLICATIONS

English Machine Translation of FR2727070A1.
English Machine Translation of KR20020010331A.
John Derks, Automatic Rooftop Carrier; Invnetion for Sale, You Tube, Nov. 14, 2014, p. 1 of 1.

* cited by examiner

*Primary Examiner* — Corey Skurdal
(74) *Attorney, Agent, or Firm* — Jason Rogers; King & Schickli, PLLC

(57) ABSTRACT

A roof rack system includes a guideway and a first cross bar displaceable along that guideway. Further, the roof rack system includes a first drive module for displacing the first cross bar along the guideway. A related method of adjusting a roof rack system is also provided.

18 Claims, 11 Drawing Sheets

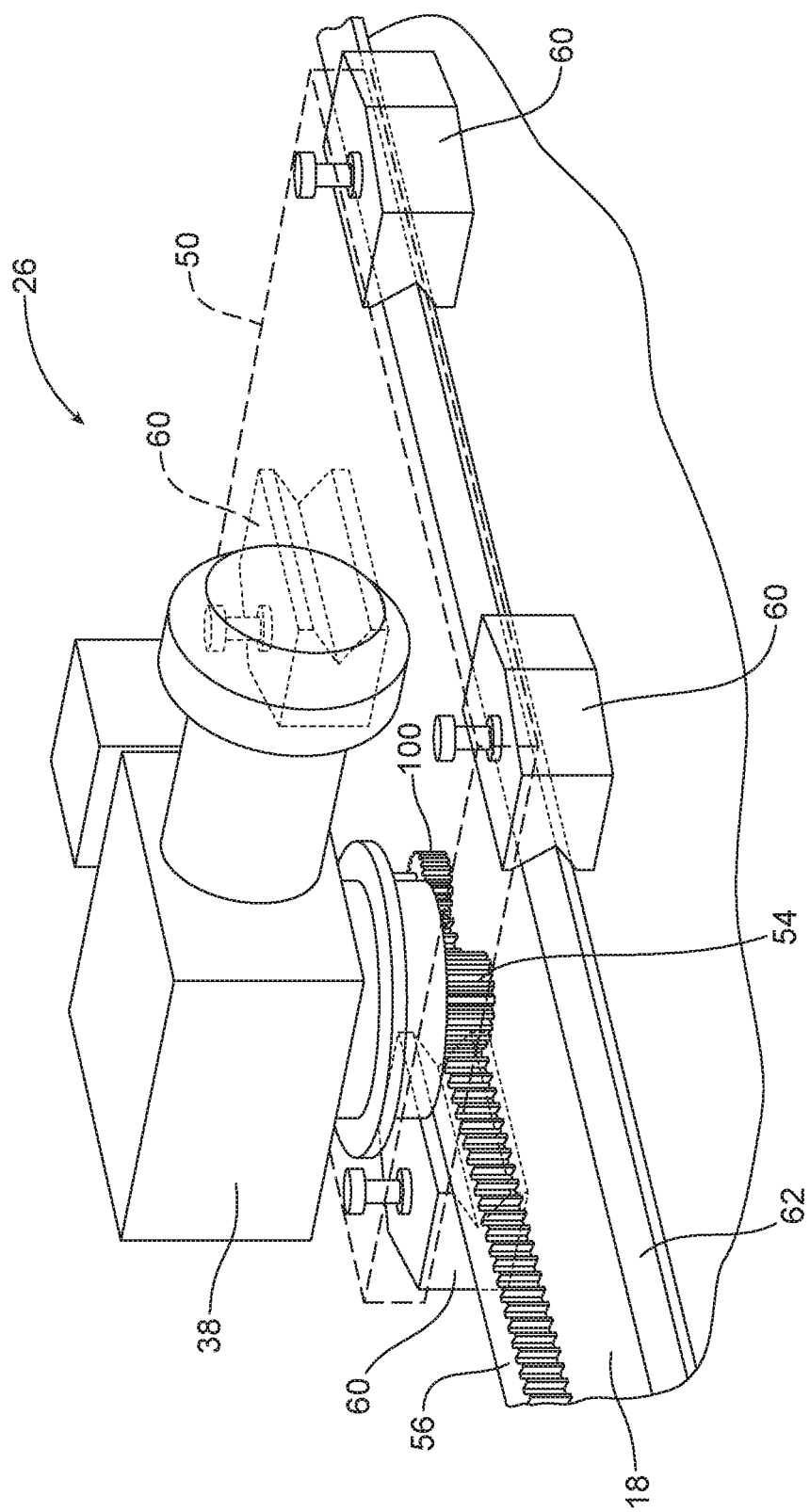

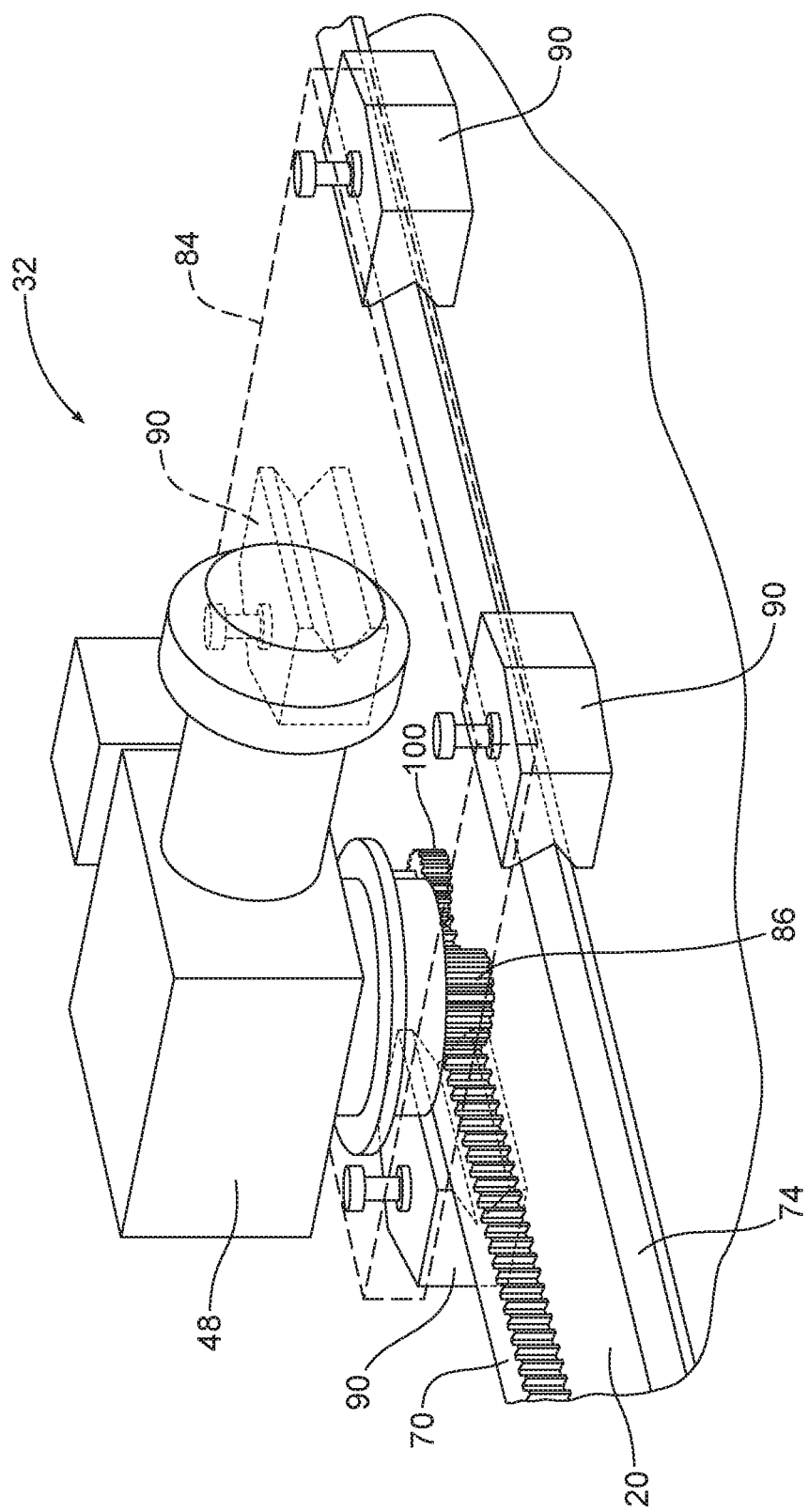

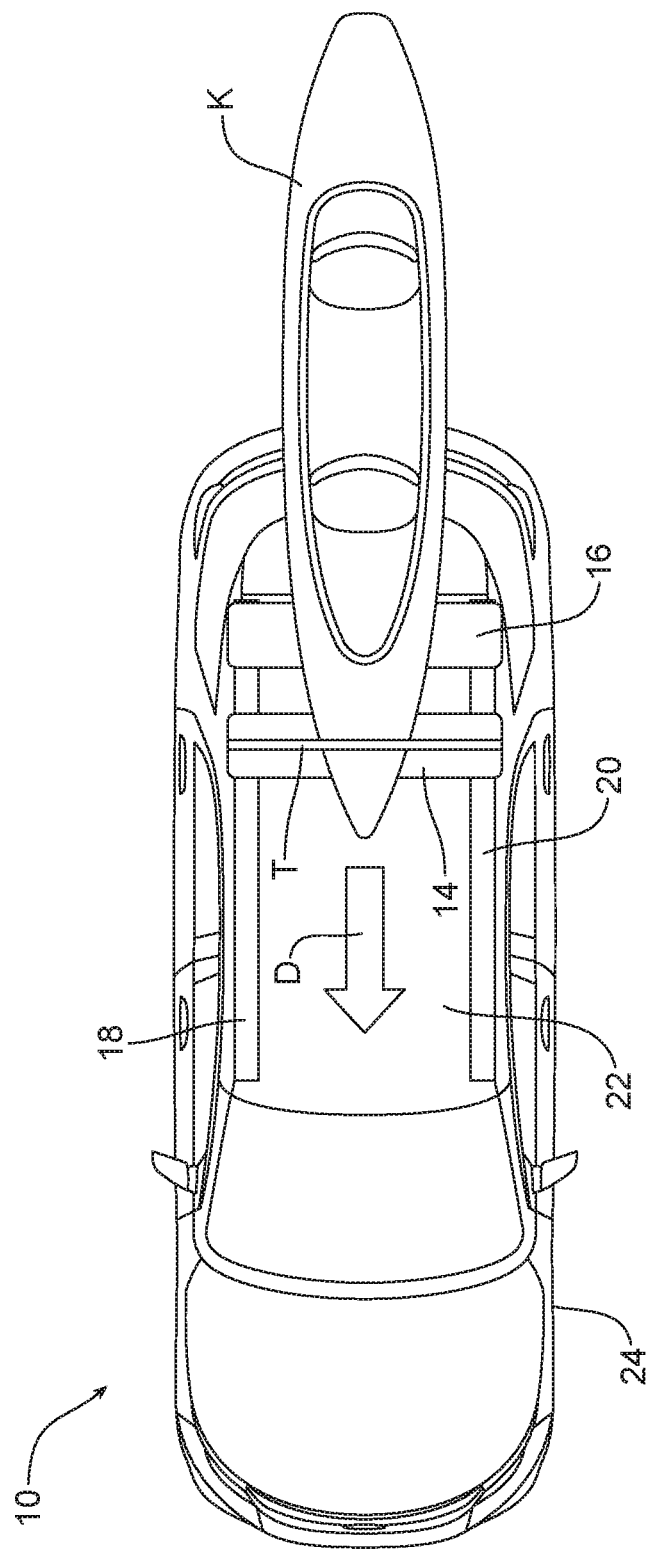

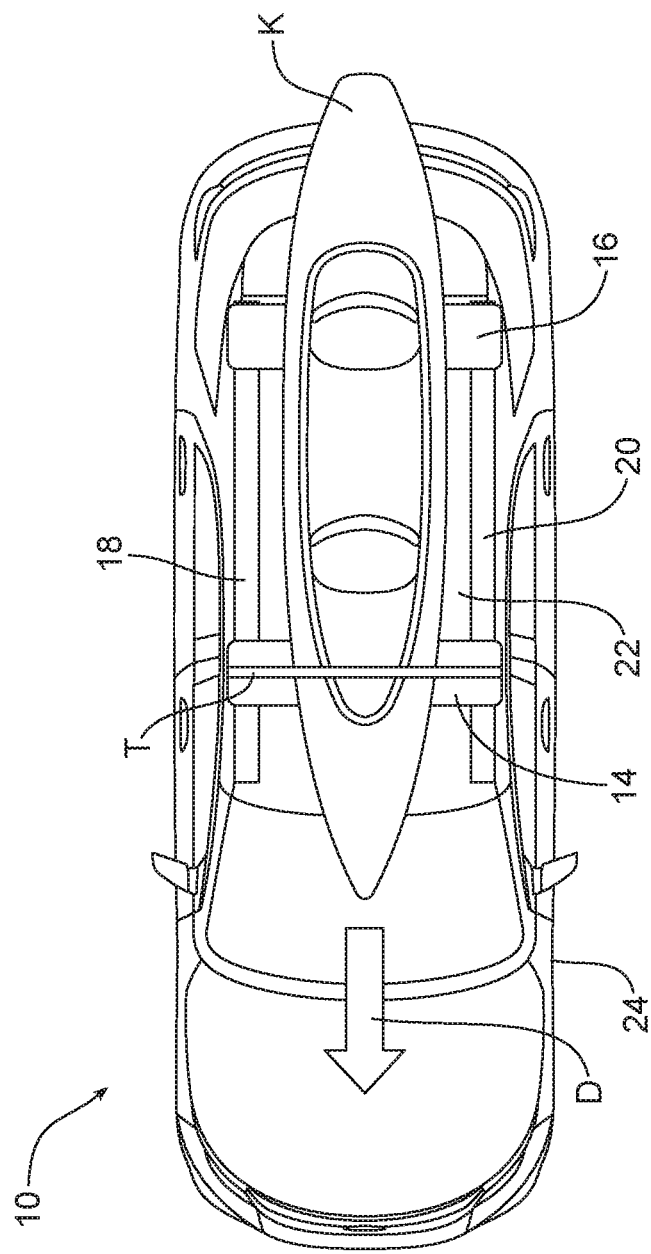

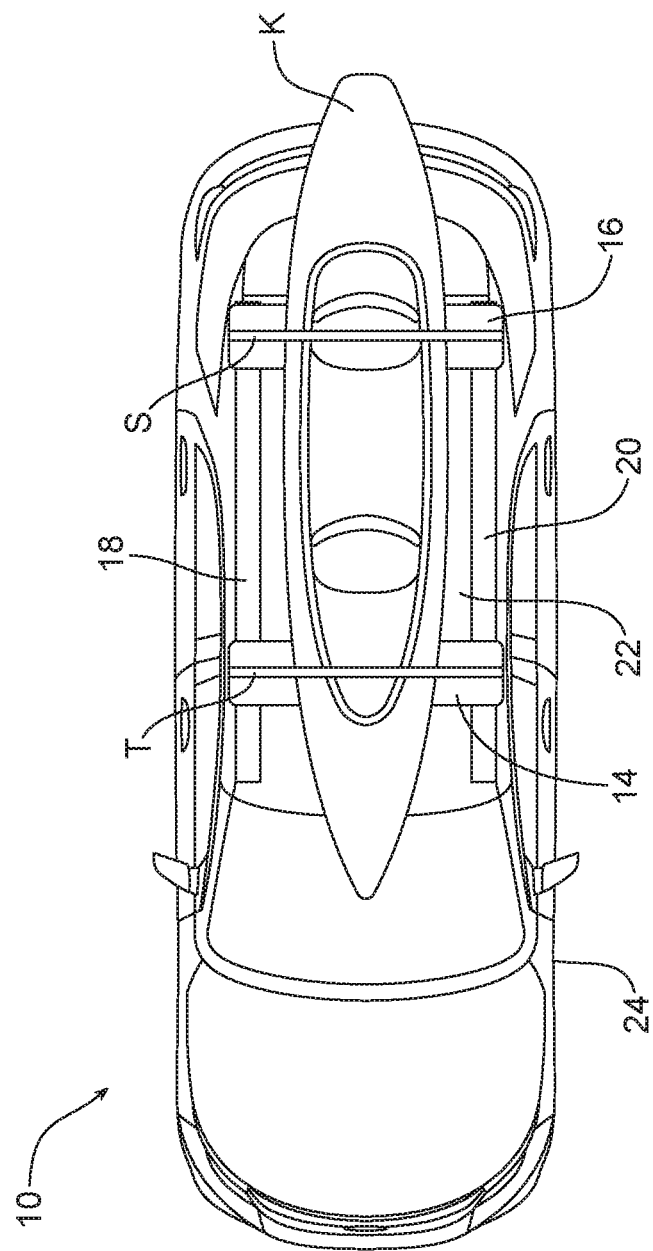

ROOF RACK SYSTEM FOR A MOTOR VEHICLE

TECHNICAL FIELD

This document relates generally to the motor vehicle equipment field and, more particularly, to a new and improved roof rack system incorporating cross bars with linear actuators to allow those cross bars to be moved automatically along a guideway fixed to the roof of a motor vehicle so that those cross bars may be conveniently and efficiently positioned as desired for any particular transport application.

BACKGROUND

Many motor vehicle operators utilize motor vehicles equipped with roof racks to allow for transportation of equipment and other articles such as, for example, kayaks, bicycles, surfboards, skateboards, cargo carriers and the like.

A typical roof rack includes two or more cross bars or roof bars extending between two longitudinal rails that run parallel to the longitudinal or X-axis of the motor vehicle. The position of the cross bars may be adjusted along the two longitudinal rails in order to accommodate and carry a particular article.

This document relates to a new and improved roof rack system incorporating linear actuators to displace the cross bars automatically to any desired position along the opposed rails in a quick and efficient manner. Advantageously, the new and improved roof rack system may also be utilized to aid an operator in positioning a heavy article or equipment to be transported on the roof rack system in a desired transport position. As such, it should be appreciated that the roof rack system disclosed herein represents a significant advance in the art.

SUMMARY

In accordance with the purposes and benefits described herein, a new and improved roof rack system is provided. That roof rack system comprises a guideway, a first cross bar displaceable along the guideway and a first drive module for selectively displacing the first cross bar along the guideway.

The guideway may include a first guide track and a second guide track. That first guide track may include a first gear rack and the second guide track may include a second gear rack.

Further, the first cross bar may include a first carriage riding on the first guide track and a second carriage riding on the second guide track. Further, the first drive module may include (a) a first controller, (b) a first drive motor and first pinion carried on the first carriage and (c) a second drive motor and second pinion carried on the second carriage.

The first drive motor may be responsive to the first controller with the first pinion meshing with the first gear rack. The second drive motor may be responsive to the first controller with the second pinion meshing with the second gear rack.

The first carriage may further include a first set of shoes or opposed slide blocks capturing and sliding along the first guide track. Similarly, the second carriage may include a second set of shoes or opposed slide blocks capturing and sliding along the second guide track.

The roof rack system may also include a second cross bar displaceable along the guideway and a second drive module displacing that second cross bar along the guideway.

The second cross bar may include a third carriage riding on the first guide track and a fourth carriage riding on the second guide track. In addition, the second module may include (a) a second controller, (b) a third drive motor and third pinion on the third carriage and (c) a fourth drive motor and fourth pinion on the fourth carriage.

The third drive motor may be responsive to the second controller with the third pinion meshing with the first gear rack. The fourth drive motor may be responsive to the second controller with the fourth pinion meshing with the second gear rack.

The third carriage may further include a third set of shoes or opposed slide blocks capturing and sliding along the first guide track. Similarly, the fourth carriage may include a fourth set of shoes or opposed slide blocks capturing and sliding along the second guide track.

In accordance with an additional aspect, a method is provided of adjusting a roof rack system. That method comprises displacing, by a first drive module, a first cross bar along a guideway of the roof rack system. Further, the method may include the step of engaging a first motor driven pinion of the first drive module with a first gear rack of the guideway. Further, the method may include engaging a second motor driven pinion of the first drive module with a second gear rack of the guideway.

In addition, the method may include displacing, by a second drive module, a second cross bar along the guideway of the roof rack system. Further, the method may include engaging a third motor driven pinion of the second drive module with the first gear rack as well as engaging a fourth motor driven pinion of the second drive module with the second gear rack.

In the following description, there are shown and described several preferred embodiments of the roof rack system as well as the related method of adjusting a roof rack and positioning an article upon the roof rack. As it should be realized, the roof rack system and method are capable of other, different embodiments and their several details are capable of modification in various, obvious aspects all without departing from the roof rack system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the roof rack system and related method and together with the description serve to explain certain principles thereof.

FIGS. 3a-3d are detailed perspective views of the respective first carriage riding on the first guide track, the second carriage riding on the second guide track, the third carriage riding on the first guide track and the fourth carriage riding on the second guide track.

FIGS. 4a-4e are top plan illustrations showing how an individual may utilize the roof rack system to help load a kayak onto the roof rack system mounted on the roof of a motor vehicle.

Reference will now be made in detail to the present preferred embodiments of the roof rack system, examples of which are illustrated in the accompanying drawing figures.

DETAILED DESCRIPTION

Figure 1:
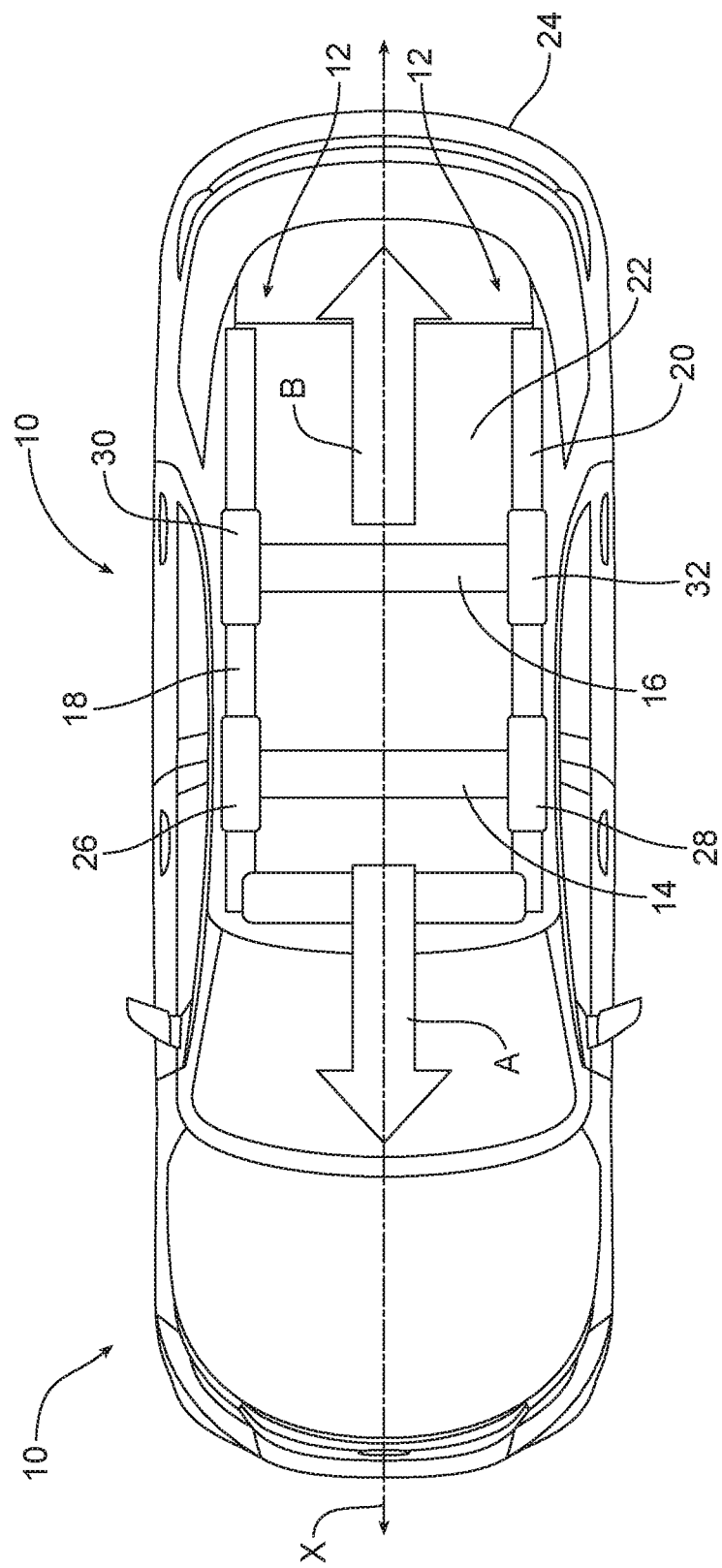
FIG. 1 is a schematical top plan view of a motor vehicle equipped with the new and improved roof rack system.

Reference is now made to FIG. 1 illustrating the new improved roof rack system 10. As illustrated, that roof rack system 10 includes a guideway, generally designated by reference numeral 12, as well as a first cross bar 14 and a second cross bar 16 that are both displaceable along the guideway.

In the illustrated embodiment, the guideway 12 includes a first guide track 18 and a second guide track 20 that are fixed to the roof 22 of the motor vehicle 24 along opposed side edges of the roof. The first guide track 18 and the second guide track 20 both extend parallel to the longitudinal or X-axis of the motor vehicle 24.

As should be further appreciated from reviewing FIG. 1, the first cross bar 14 includes a first carriage 26 that rides on the first guide track 18 and a second carriage 28 that rides on the second guide track 20. Similarly, the second cross bar 16 includes a third carriage 30 that rides on the first guide track 18 and a fourth carriage 32 that rides on the second guide track 20.

Figure 2:
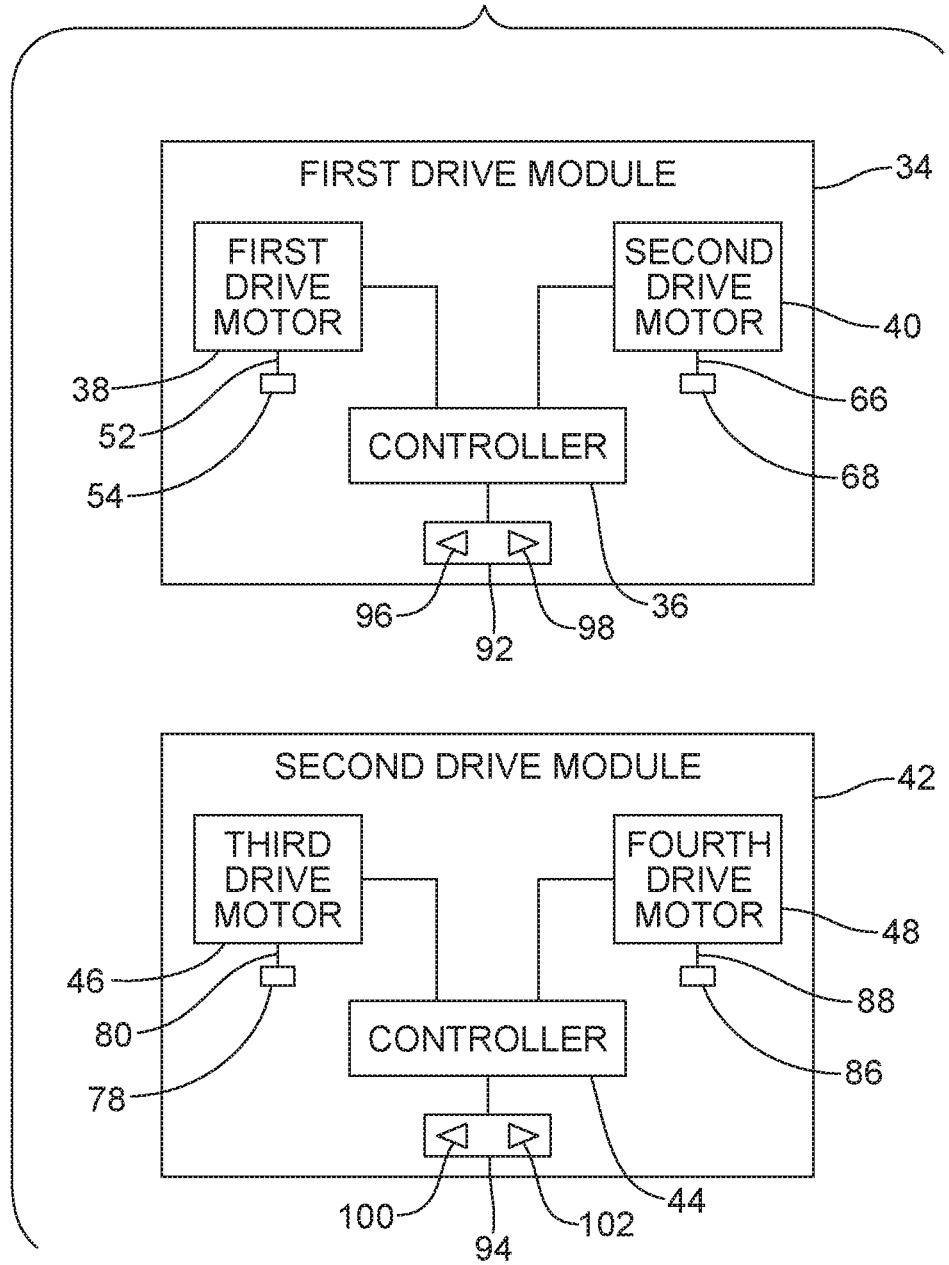
FIG. 2 is a schematic block diagram of the control system for displacing the first and second cross bars along the guideway of the roof rack system.

A first drive module 34 functions to displace the first cross bar 14 over the guideway 12 along the longitudinal axis X of the motor vehicle 24 (see also FIG. 2). That first drive module 34 includes a first controller 36 connected to a first drive motor 38 carried on the first carriage 26 and a second drive motor 40 carried on the second carriage 28.

In addition, the roof rack system 10 includes a second drive module 42 that includes a second controller 44 connected to and controlling a third drive motor 46 carried on the third carriage 30 and a fourth drive motor 48 carried on the fourth carriage 32.

The first controller 36 and the second controller 44 may each comprise a computing device in the form of a dedicated microprocessor or an electronic control unit (ECU) operating in accordance with instructions provided by appropriate control software. Thus, the first controller 36 and the second controller 44 may comprise one or more processors, one more memories and one or more network interfaces all in communication with each other over a communication bus. In some embodiments the first controller 36 and the second controller 44 may be embodied in the same computing device.

Reference is now made to FIG. 3a illustrating the first carriage 26 in detail. As shown, the carriage 26 includes a base 50. The first drive motor 38 is fixed to the base 50 at the upper face thereof. The first drive motor 38 is connected by a drive shaft 52 to a first pinion 54 (see also FIG. 2). As illustrated in FIG. 3a, the first guide track 18 includes a first gear rack 56. The first pinion 54 meshes with the first gear rack 56.

As illustrated in FIG. 3a, the first carriage 26 also includes a first set of four shoes or opposed slide blocks 60, one slide block at each corner of the base 50. The first set of opposed slide blocks 60 capture and slide along opposed V-shaped guide flanges 62 of the first guide track 18. As should be appreciated, the first set of slide blocks 60 may be made from a low friction material such as nylon or the like.

Figure 3B:
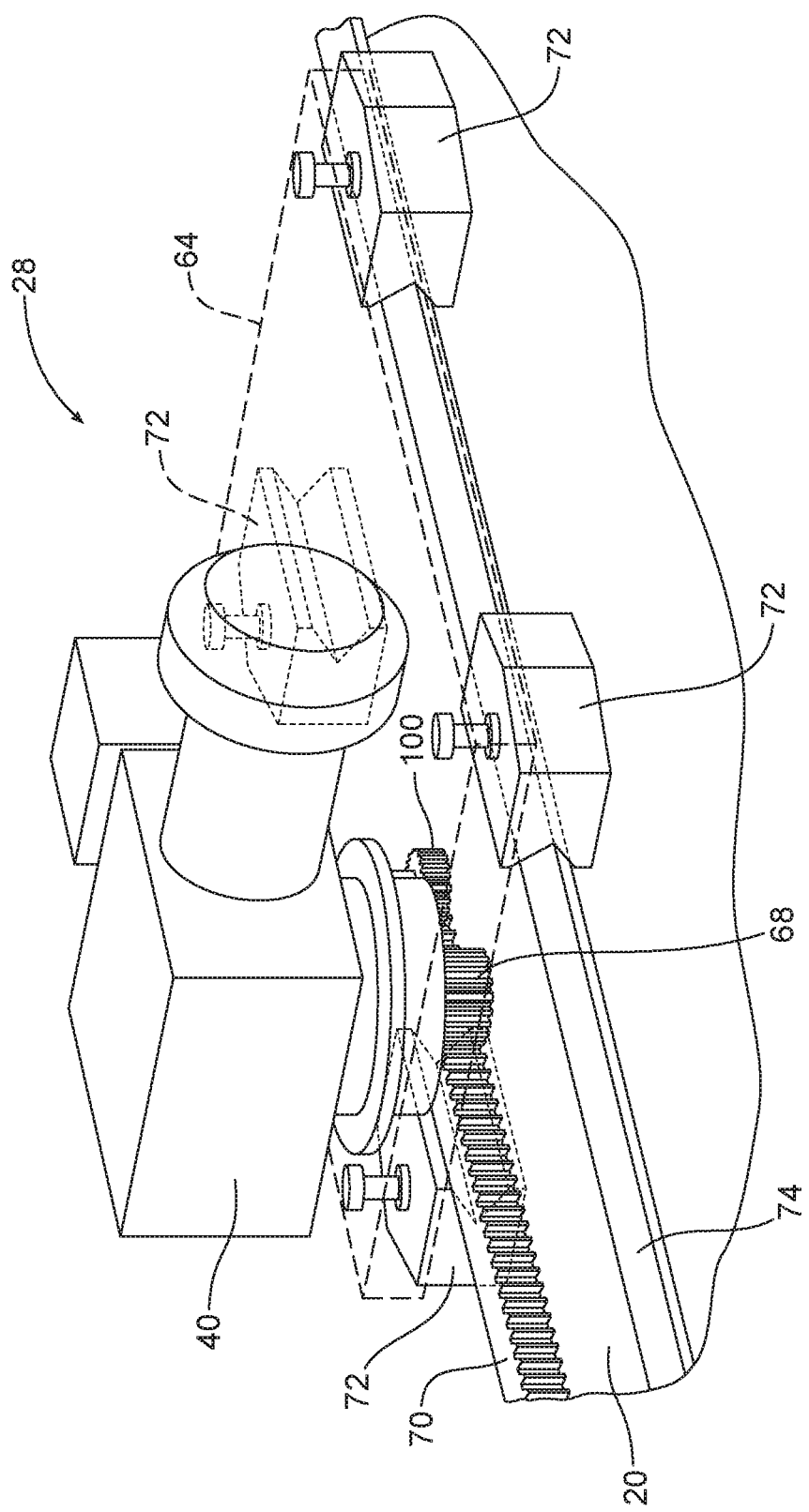

Reference is now made to FIG. 3b illustrating the second carriage 28 in detail. The second carriage 28 includes a base 64. The second drive motor 40 is fixed to the base 64. The second drive motor 40 includes a drive shaft 66 connected to a second pinion 68 that meshes with a second gear rack 70 of the second guide track 20 (see also FIG. 2). A second set of four shoes or slide blocks 72 are carried on the base 64. More specifically, one slide block 72 is provided at each corner of the base 64. The second set of opposed slide blocks 72 capture and slide along the opposed V-shaped guide flanges 74 of the second guide track 20.

Figure 3C:
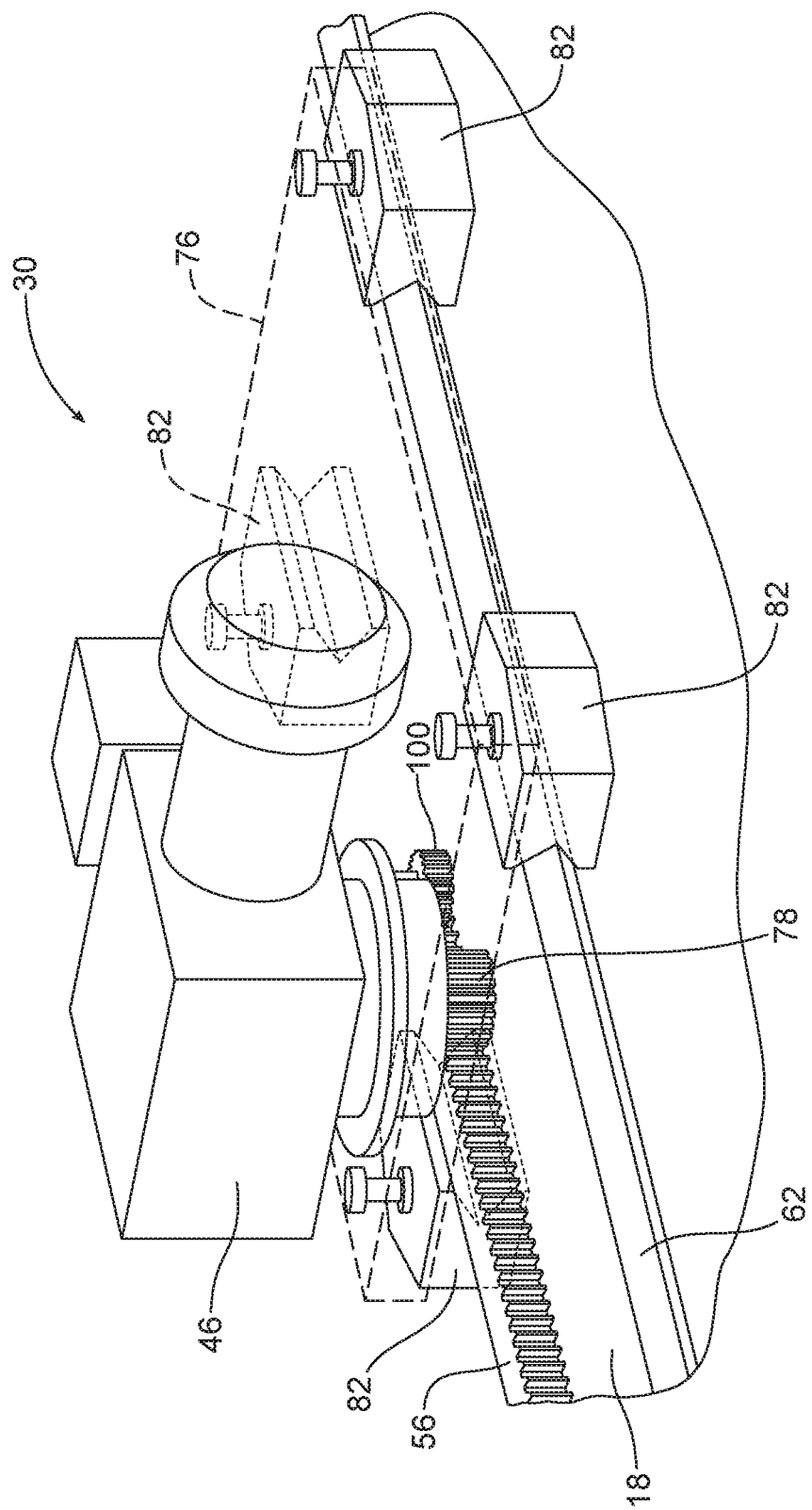

Reference is now made to FIG. 3c illustrating the third carriage 30 in detail. The third carriage 30 includes a base 76. The third drive motor 46 is fixed to the base 76. That third drive motor 46 is connected to a third pinion 78 of the drive shaft 80. The third pinion 78 meshes with the first gear rack 56 of the first guide track 18. A third set of four shoes or slide blocks 82 are carried on the base 76 and capture and slide along the opposed V-shaped guide flanges 62 of the first guide track 18.

Reference is now made to FIG. 3d which illustrates the fourth carriage 32 in detail. The fourth carriage 32 includes a base 84. The fourth drive motor 48 is fixed to the base 84. The fourth drive motor 48 drives a fourth pinion 86 through the drive shaft 88. That fourth pinion 86 meshes with the second gear rack 70 of the second guide track 20. In addition, the fourth carriage 32 includes a fourth set of four shoes or slide blocks 90 that capture and slide along the opposed V-shaped guide flanges 74 of the second guide track 20.

In operation, one may selectively position the first cross bar 14 or the second cross bar 16 at any desired position along the guideway 12 by manipulation of the operator interfaces 92, 94 (see FIG. 2). More specifically as illustrated in FIG. 2, the operator interface 92 includes a first push button for displacing the first cross bar 14 in a motor vehicle forward direction as illustrated by action arrow A (see also FIG. 1). In contrast, one depresses the push button 98 to displace the first cross bar 14 in a motor vehicle rearward direction as indicated by action arrow B.

The operator interface 94 includes the push button 100 for displacing the second cross bar 16 in the motor vehicle forward direction illustrated by action arrow A or push button 102 for displacing the second cross bar 16 in the motor vehicle rearward direction as illustrated by action arrow B.

The operator interfaces 92, 94 may be provided at substantially any convenient location on the motor vehicle or, alternatively, they may be provided on a key FOB that is matched to the motor vehicle 24 by security code in a manner known in the art. In yet another possible embodiment, the operator interfaces 92, 94 may be incorporated in an APP that may be run on the operator's smart phone device.

When the push button 96 is depressed and held, the controller 36 sends an appropriate control signal to the first drive motor 38 and the second drive motor 40. The first drive motor 38 and the second drive motor 40 are responsive to the controller 36 and operate synchronously to displace the first cross bar 14 in the direction of action arrow A. When the push button 96 is released, the controller 36 sends a control signal to the first drive motor 38 and the second drive motor 40 to cease operation. In contrast, when the operator depresses and holds the push button 98, the controller 36 sends a control signal to the first drive motor 38 and the second drive motor 40 which respond synchronously to displace the first cross bar 14 in the direction of action arrow B until the push button 98 is released. In the event the first and second carriages 26, 28 of the first cross bar 14 reach the end of the first gear rack 56 and second gear rack 70 or engage the third carriage 30 and fourth carriage 32 of the second cross bar 16, the controller 36 sends a deactivation signal to the first drive motor 38 and second drive motor 40.

When the push button 100 is depressed and held, the controller 44 sends an appropriate control signal to the third drive motor 46 and the fourth drive motor 48. The third drive motor 46 and the fourth drive motor 48 are responsive to the controller 44 and operate synchronously to displace the second cross bar 16 in the direction of action arrow A. When the push button 100 is released, the controller 44 sends a control signal to the third drive motor 46 and the fourth drive motor 48 to cease operation. In contrast, when the operator depresses and holds the push button 102, the controller 44 sends a control signal to the third drive motor 46 and the fourth drive motor 48 which respond synchronously to displace the second cross bar 16 in the direction of action arrow B until the push button 102 is released. In the event the third and fourth carriages 30, 32 of the second cross bar 16 reach the end of the first and second gear racks 56, 70 or engage the first carriage 26 and the second carriage 28 of the first cross bar 14, the controller 44 sends a deactivation signal to the third drive motor 46 and the fourth drive motor 48.

Consistent with the above description, a method is provided of adjusting a roof rack system 10. That method comprises the step of displacing, by a first drive module 34, the first cross bar 14 along the guideway 12 of the roof rack system 10. Toward this end the method may also include the step of engaging a first motor driven pinion 54 with a first gear rack 56 of the guideway 12 and a second motor driven pinion 68 of the first drive module with a second gear rack 70 of the guideway.

Further, the method may include displacing, by a second drive module 42, the second cross bar 16 along the guideway 12 of the roof rack system 10. Toward this end the method may include engaging a third motor driven pinion 78 of the second drive module 42 with the first gear rack 56 and a fourth motor driven pinion 86 of the second drive module with the second gear rack 70.

Figure 4A:
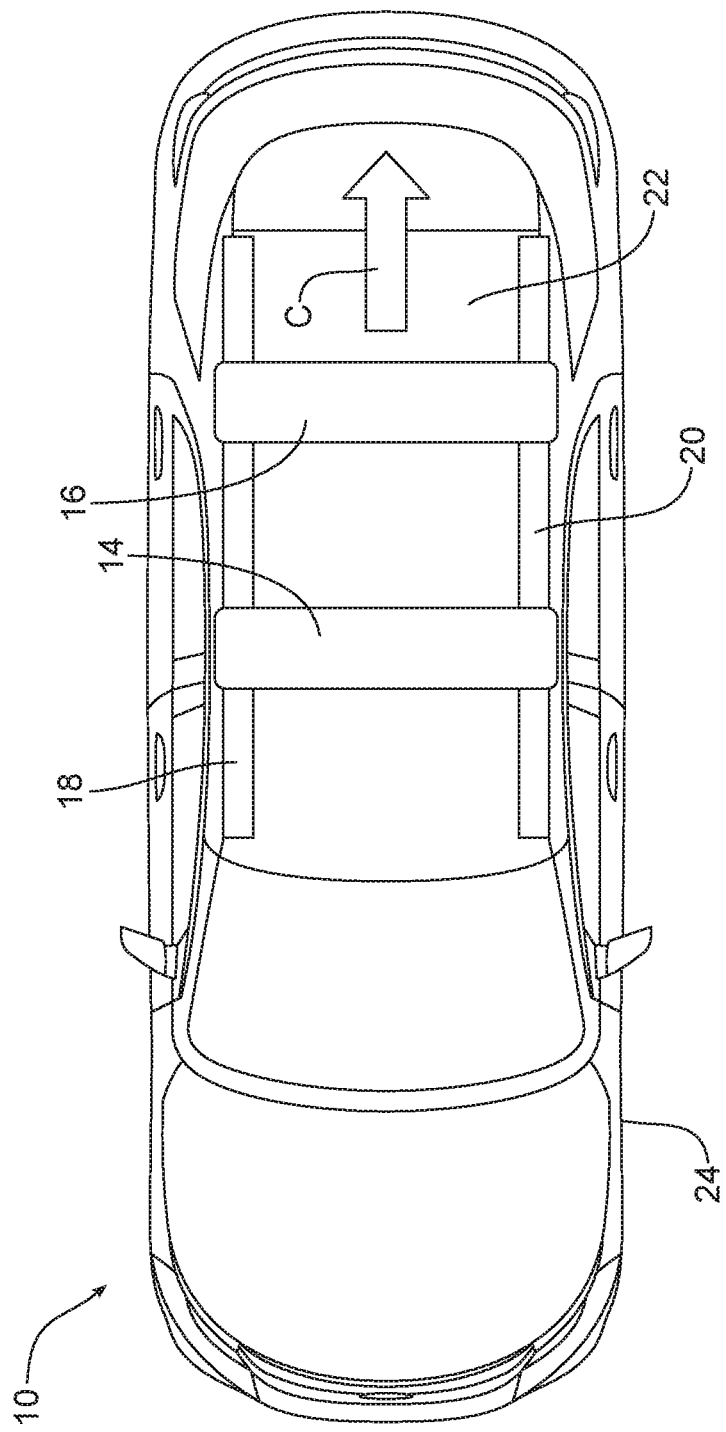
Figure 4B:
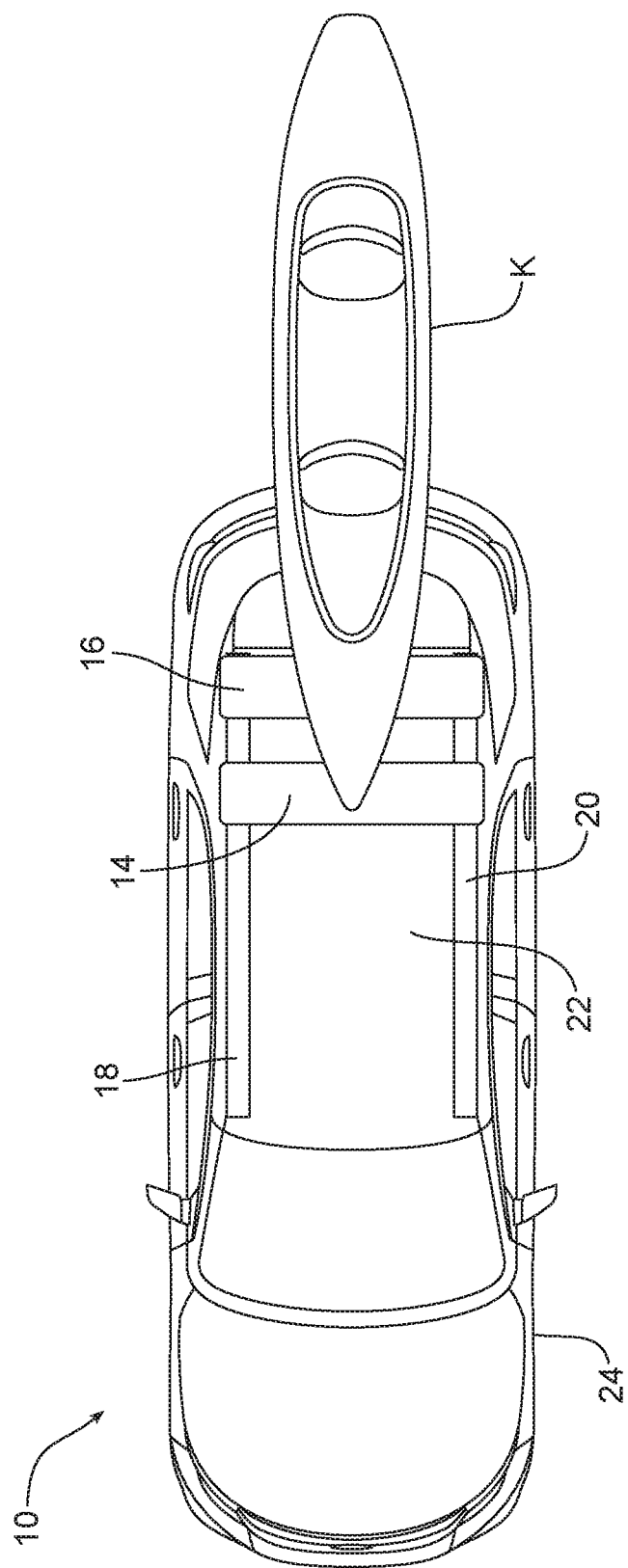

Reference is now made to FIGS. 4a-4e illustrating how the roof rack system 10 may be utilized to help load an article such as a kayak K onto the roof rack system on the roof 22 of the motor vehicle 24. As illustrated by action arrows C in FIG. 4a, one first moves the first cross bar 14 and the second cross bar 16 motor vehicle rearward on the guideway 12. Next, as illustrated in FIG. 4b, one positions the front end of the kayak K on top of the first cross bar 14 and the second cross bar 16.

As illustrated in FIG. 4c, one then attaches the front end of the kayak K to the first cross bar 14 by means of a tie strap T or other device.

Next, the operator depresses and holds push button 96 causing the controller 36 to send a control signal to the first drive motor 38 and the second drive motor 40 which respond to that signal by driving the first pinion 54 and second pinion 68 so that the first cross bar 14 is moved motor vehicle forward (note action arrow D) along the guideway 12. This serves to pull the attached kayak K motor vehicle forward with respect to the second cross bar 16 and the roof 22 of the motor vehicle (see FIG. 4d). Once the kayak K is properly positioned, the rear end of the kayak is connected to the second cross bar 16 by means of a second tie strap S (see FIG. 4e).

As should be appreciated, numerous benefits and advantages are provided by the roof rack system 10. As illustrated in FIGS. 4a-4e, the roof rack system 10 may be utilized to help position an article such as a kayak K on the roof rack 10 overlying the roof 22 of the motor vehicle 24 thereby minimizing the physical effort required to pack and unpack articles. As described above, the first cross bar 14 and second cross bar 16 may be moved automatically using the four motors 38, 40, 46, 48 controlled by operation of the operator interfaces 92, 94 in order to achieve this end.

In some embodiments, the first cross bar 14 and the second cross bar 16 may be easily detached and attached from the respective carriages 26, 28, 30, 32 if desired.

The foregoing has been presented for purposes of illustration and description. It is not intended to be exhaustive or to limit the embodiments to the precise form disclosed. Obvious modifications and variations are possible in light of the above teachings. For example, the roof rack system 10 may include just one displaceable cross bar 14 instead of the two displaceable cross bars 14, 16 illustrated. Alternatively, the roof rack system 10 could include a third displaceable cross bar. Further, as illustrated in FIGS. 3a-3d, each carriage 26, 28, 30, 32 may include an optional second pinion 100. That pinion 100 may be driven by the same motor 38, 40, 46, 48 as the other pinion 54, 68, 78, 86 of the respective carriage 26, 28, 30, 32 or a second motor (not shown) carried on each carriage 26, 28, 30, 32. Such an arrangement serves to better distribute the applied force and reduce gear and rack wear. All such modifications and variations are within the scope of the appended claims when interpreted in accordance with the breadth to which they are fairly, legally and equitably entitled.

What is claimed:

1. A roof rack system, comprising:
a guideway;
a first cross bar displaceable along said guideway;
a first drive module for displacing said first cross bar along said guideway; and
a second cross bar displaceable along said guideway and a second drive module displacing said second cross bar along said guideway,
whereby the first and second cross bars are independently displaceable with respect to one another by the first and second drive modules, respectively.

2. The roof rack system of claim 1, wherein said guideway includes a first guide track and a second guide track.

3. The roof rack system of claim 2, wherein said first guide track includes a first gear rack and said second guide track includes a second gear rack.

4. The roof rack system of claim 3, wherein said first cross bar includes a first carriage riding on said first guide track and a second carriage riding on said second guide track.

5. The roof rack system of claim 4, wherein said first drive module includes (a) a first controller, (b) a first drive motor and first pinion carried on said first carriage and (c) a second drive motor and second pinion carried on said second carriage.

6. The roof rack system of claim 5, wherein said first drive motor is responsive to said first controller, said first pinion meshes with said first gear rack, said second drive motor is responsive to said first controller and said second pinion meshes with said second gear rack.

7. The roof rack system of claim 6, wherein said first carriage further includes a first set of opposed slide blocks capturing and sliding along said first guide track.

8. The roof rack system of claim 7, wherein said second carriage further includes a second set of opposed slide blocks capturing and sliding along said second guide track.

9. The roof rack system of claim 8, wherein said second cross bar includes a third carriage riding on said first guide track and a fourth carriage riding on said second guide track.

10. The roof rack system of claim 9, wherein said second drive module includes (a) a second controller, (b) a third drive motor and third pinion on said third carriage and (c) a fourth drive motor and fourth pinion on said fourth carriage.

11. The roof rack system of claim 10, wherein said third drive motor is responsive to said second controller, said third pinion meshes with said first gear rack, said fourth drive motor is responsive to said second controller and said fourth pinion meshes with said second gear rack.

12. The roof rack system of claim 11, wherein said third carriage further includes a third set of opposed slide blocks capturing and sliding along said first guide track.

13. The roof rack system of claim 12, wherein said fourth carriage further includes a fourth set of opposed slide blocks capturing and sliding along said second guide track.

14. A method of adjusting a roof rack system, comprising:

providing a first and a second cross bar along a guideway of said roof rack system;

displacing, by a first drive module, the first cross bar along the guideway of said roof rack system independently from the second cross bar; and displacing, by a second drive module, the second cross bar along the guideway of said roof rack system independently from the first cross bar.

15. The method of claim 14, further including engaging a first motor driven pinion of said first drive module with a first gear rack of said guideway.

16. The method of claim 15, further including engaging a second motor driven pinion of said first drive module with a second gear rack of said guideway.

17. The method of claim 16, including engaging a third motor driven pinion of said second drive module with said first gear rack.

18. The method of claim 17, including engaging a fourth motor driven pinion of said second drive module with said second gear rack.

* * * * *